(12) United States Patent
Jacobsen (10) Patent No.: US 8,185,241 B2
(45) Date of Patent: May 22, 2012

(54) TRACKED ROBOTIC CRAWLER HAVING A MOVEABLE ARM

(75) Inventor: Stephen C. Jacobsen, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 1032 days.

(21) Appl. No.: 11/985,336

(22) Filed: Nov. 13, 2007

(65) Prior Publication Data

US 2008/0167752 A1    Jul. 10, 2008

Related U.S. Application Data

(60) Provisional application No. 60/858,915, filed on Nov. 13, 2006.

(51) Int. Cl.
*G05B 19/04* (2006.01)
*G05B 15/00* (2006.01)

(52) U.S. Cl. ............... 700/250; 700/1; 700/245; 901/1; 901/29

(58) Field of Classification Search .................. None
See application file for complete search history.

(56) References Cited

U.S. PATENT DOCUMENTS

| | | | |
|---|---|---|---|
| 1,107,874 A | 8/1914 | Appleby |
| 1,112,460 A | 10/1914 | Leavitt |
| 1,515,756 A | 11/1924 | Roy |
| 1,975,726 A | 10/1934 | Martinage |
| 2,025,999 A | 12/1935 | Myers |
| 2,082,920 A | 6/1937 | Aulmont |
| 2,129,557 A | 9/1938 | Beach |
| 2,311,475 A | 2/1943 | Schmeiser |
| 2,312,072 A | 2/1943 | Broadwater |
| 2,329,582 A | 9/1943 | Bishop |
| 2,345,763 A | 4/1944 | Mayne |
| 2,701,169 A | 2/1955 | Cannon |
| 2,850,147 A | 9/1958 | Hill |
| 2,933,143 A | 4/1960 | Robinson et al. |
| 2,967,737 A | 1/1961 | Moore |
| 3,037,571 A | 6/1962 | Zelle |
| 3,060,972 A | 10/1962 | Aheldon |
| 3,166,138 A | 1/1965 | Dunn, Jr. |
| 3,190,286 A | 6/1965 | Stokes |
| 3,215,219 A | 11/1965 | Forsyth et al. |

(Continued)

FOREIGN PATENT DOCUMENTS

CA    2512299    9/2004

(Continued)

OTHER PUBLICATIONS

Arnold, Henry, "Cricket the robot documentation." online manual available at http://www.parallaxinc.com, 22 pages.

(Continued)

*Primary Examiner* — Khoi Tran
*Assistant Examiner* — Ian Jen
(74) *Attorney, Agent, or Firm* — Thorpe North & Western LLP (57) ABSTRACT

A tracked robotic crawler capable of multiple movement moves is disclosed. In one embodiment, the tracked robotic crawler includes at least one frame unit, the frame unit having a continuous track rotatably coupled thereto. Disposed on the at least one frame unit is at least one articulated arm, the arm being movable relative to the frame unit in at least one dimension. The articulated arm helps to improve mobility of the tracked robotic crawler in various environments.

24 Claims, 8 Drawing Sheets

U.S. PATENT DOCUMENTS

| | | | |
|---|---|---|---|
| 3,223,462 A | 12/1965 | Dalrymple | |
| 3,266,059 A | 8/1966 | Stelle | |
| 3,284,964 A | 11/1966 | Saito | |
| 3,311,424 A | 3/1967 | Taylor | |
| 3,362,492 A | 1/1968 | Hansen | |
| 3,387,896 A | 6/1968 | Sobota | |
| 3,489,236 A | 1/1970 | Goodwin | |
| 3,497,083 A | 2/1970 | Abdersib | |
| 3,565,198 A | 2/1971 | Ames | |
| 3,572,325 A | 3/1971 | Bazell et al. | |
| 3,609,804 A | 10/1971 | Morrison | |
| 3,650,343 A | 3/1972 | Helsell | |
| 3,700,115 A | 10/1972 | Johnson et al. | |
| 3,707,218 A | 12/1972 | Payne et al. | |
| 3,712,481 A | 1/1973 | Harwood | |
| 3,715,146 A | 2/1973 | Robertson | |
| 3,757,635 A | 9/1973 | Hickerson et al. | |
| 3,808,078 A | 4/1974 | Snellman et al. | |
| 3,820,616 A | 6/1974 | Juergens | |
| 3,841,424 A | 10/1974 | Purcell et al. | |
| 3,864,983 A | 2/1975 | Jacobsen | |
| 3,933,214 A | 1/1976 | Guibord et al. | |
| 3,934,664 A | 1/1976 | Pohjola | |
| 3,974,907 A | 8/1976 | Shaw et al. | |
| 4,051,914 A | 10/1977 | Pohjola | |
| 4,059,315 A | 11/1977 | Jolliffe et al. | |
| 4,068,905 A | 1/1978 | Black et al. | |
| 4,107,948 A | 8/1978 | Molaug | |
| 4,109,971 A | 8/1978 | Black et al. | |
| 4,132,279 A | 1/1979 | Van der Lende et al. | |
| 4,218,101 A | 8/1980 | Thompson | |
| 4,260,053 A | 4/1981 | Onodera | |
| 4,332,317 A | 6/1982 | Bahre et al. | |
| 4,332,424 A | 6/1982 | Thompson | |
| 4,339,031 A | 7/1982 | Densmore | |
| 4,393,728 A | 7/1983 | Larson et al. | |
| 4,396,233 A | 8/1983 | Slaght | |
| 4,453,611 A | 6/1984 | Stacy, Jr. | |
| 4,483,407 A * | 11/1984 | Iwamoto et al. | 180/9.5 |
| 4,489,826 A | 12/1984 | Dubson | |
| 4,494,417 A | 1/1985 | Larson et al. | |
| 4,551,061 A | 11/1985 | Olenick | |
| 4,589,460 A | 5/1986 | Albee | |
| 4,621,965 A | 11/1986 | Wilcock | |
| 4,636,137 A | 1/1987 | Lemelson | |
| 4,646,906 A | 3/1987 | Wilcox, Jr. et al. | |
| 4,661,039 A | 4/1987 | Brenholt | |
| 4,671,774 A | 6/1987 | Owsen | |
| 4,700,693 A | 10/1987 | Lia et al. | |
| 4,706,506 A | 11/1987 | Lestelle | |
| 4,712,969 A | 12/1987 | Kimura | |
| 4,713,896 A | 12/1987 | Jennens | |
| 4,714,125 A | 12/1987 | Stacy, Jr. | |
| 4,727,949 A | 3/1988 | Rea et al. | |
| 4,736,826 A | 4/1988 | White et al. | |
| 4,752,105 A | 6/1988 | Barnard | |
| 4,756,662 A | 7/1988 | Tanie et al. | |
| 4,765,795 A | 8/1988 | Rebman | |
| 4,784,042 A | 11/1988 | Painter | |
| 4,796,607 A | 1/1989 | Allred, III et al. | |
| 4,806,066 A | 2/1989 | Rhodes et al. | |
| 4,815,319 A | 3/1989 | Clement et al. | |
| 4,815,911 A | 3/1989 | Bengtsson et al. | |
| 4,818,175 A | 4/1989 | Kimura | |
| 4,828,339 A | 5/1989 | Thomas et al. | |
| 4,828,453 A | 5/1989 | Martin et al. | |
| 4,848,179 A | 7/1989 | Ubhayakar | |
| 4,862,808 A | 9/1989 | Hedgcoxe et al. | |
| 4,878,451 A | 11/1989 | Siren | |
| 4,900,218 A | 2/1990 | Suthreland | |
| 4,909,341 A | 3/1990 | Rippingale et al. | |
| 4,924,153 A | 5/1990 | Toru et al. | |
| 4,932,491 A | 6/1990 | Collins, Jr. | |
| 4,932,831 A | 6/1990 | White et al. | |
| 4,936,639 A | 6/1990 | Pohjola | |
| 4,977,790 A | 12/1990 | Nishi et al. | |
| 5,018,591 A | 5/1991 | Price | |
| 5,021,798 A | 6/1991 | Ubhayakar | |
| 5,022,812 A | 6/1991 | Coughlan et al. | |
| 5,046,914 A | 9/1991 | Holland et al. | |
| 5,080,000 A | 1/1992 | Bubic | |
| 5,130,631 A | 7/1992 | Gordon et al. | |
| 5,142,932 A | 9/1992 | Moya et al. | |
| 5,174,168 A | 12/1992 | Takagi et al. | |
| 5,174,405 A | 12/1992 | Carra et al. | |
| 5,186,526 A | 2/1993 | Pennington | |
| 5,199,771 A | 4/1993 | James et al. | |
| 5,205,612 A | 4/1993 | Sugden et al. | |
| 5,214,858 A | 6/1993 | Pepper et al. | |
| 5,219,264 A | 6/1993 | McClure et al. | |
| 5,252,870 A | 10/1993 | Jacobsen et al. | |
| 5,297,443 A | 3/1994 | Wentz | |
| 5,317,952 A | 6/1994 | Immega | |
| 5,337,732 A | 8/1994 | Grundfest et al. | |
| 5,350,033 A | 9/1994 | Kraft | |
| 5,354,124 A | 10/1994 | James | |
| 5,363,935 A * | 11/1994 | Schempf et al. | 180/9.1 |
| 5,386,741 A | 2/1995 | Rennex | |
| 5,413,454 A | 5/1995 | Movsesian | |
| 5,426,336 A | 6/1995 | Jacobsen et al. | |
| 5,428,713 A | 6/1995 | Matsumaru | |
| 5,435,405 A | 7/1995 | Schempf et al. | |
| 5,440,916 A | 8/1995 | Stone et al. | |
| 5,443,354 A | 8/1995 | Stone et al. | |
| 5,451,135 A | 9/1995 | Schempf et al. | |
| 5,465,525 A * | 11/1995 | Mifune et al. | 43/132.1 |
| 5,466,056 A | 11/1995 | James et al. | |
| 5,469,756 A | 11/1995 | Feiten | |
| 5,516,249 A | 5/1996 | Brimhall | |
| 5,551,545 A | 9/1996 | Gelfman | |
| 5,556,370 A | 9/1996 | Maynard | |
| 5,562,843 A | 10/1996 | Yasumoto | |
| 5,567,110 A | 10/1996 | Sutherland | |
| 5,570,992 A | 11/1996 | Lemelson | |
| 5,573,316 A | 11/1996 | Wankowski | |
| 5,588,688 A | 12/1996 | Jacobsen et al. | |
| 5,672,044 A | 9/1997 | Lemelson | |
| 5,697,285 A | 12/1997 | Nappi et al. | |
| 5,712,961 A | 1/1998 | Matsuo | |
| 5,749,828 A | 5/1998 | Solomon et al. | |
| 5,770,913 A | 6/1998 | Mizzi | |
| 5,816,769 A | 10/1998 | Bauer et al. | |
| 5,821,666 A | 10/1998 | Matsumoto et al. | |
| 5,842,381 A | 12/1998 | Feiten | |
| RE36,025 E | 1/1999 | Suzuki | |
| 5,878,783 A | 3/1999 | Smart | |
| 5,888,235 A | 3/1999 | Jacobsen et al. | |
| 5,902,254 A | 5/1999 | Magram | |
| 5,906,591 A | 5/1999 | Dario et al. | |
| 5,984,032 A | 11/1999 | Gremillion et al. | |
| 5,996,346 A | 12/1999 | Natbard | |
| 6,016,385 A | 1/2000 | Yee et al. | |
| 6,030,057 A | 2/2000 | Fikse | |
| 6,056,237 A | 5/2000 | Woodland | |
| 6,107,795 A | 8/2000 | Smart | |
| 6,109,705 A | 8/2000 | Courtemanche | |
| 6,113,343 A * | 9/2000 | Goldenberg et al. | 414/729 |
| 6,132,133 A | 10/2000 | Muro et al. | |
| 6,138,604 A | 10/2000 | Anderson et al. | |
| 6,162,171 A | 12/2000 | Ng et al. | |
| 6,186,604 B1 | 2/2001 | Fikse | |
| 6,203,126 B1 | 3/2001 | Harguth | |
| 6,260,501 B1 | 7/2001 | Agnew | |
| 6,263,989 B1 | 7/2001 | Won | |
| 6,264,293 B1 | 7/2001 | Musselman et al. | |
| 6,264,294 B1 | 7/2001 | Musselman et al. | |
| 6,281,489 B1 | 8/2001 | Tubel et al. | |
| 6,323,615 B1 | 11/2001 | Khairallah | |
| 6,325,749 B1 | 12/2001 | Inokuchi et al. | |
| 6,333,631 B1 | 12/2001 | Das et al. | |
| 6,339,993 B1 | 1/2002 | Comello et al. | |
| 6,380,889 B1 | 4/2002 | Herrmann | |
| 6,394,204 B1 | 5/2002 | Haringer | |
| 6,405,798 B1 | 6/2002 | Barrett et al. | |
| 6,408,224 B1 | 6/2002 | Okamoto et al. | |
| 6,411,055 B1 | 6/2002 | Fujita et al. | |
| 6,422,509 B1 | 7/2002 | Yim | |

| | | |
|---|---|---|
| 6,430,475 B2 | 8/2002 | Okamoto et al. |
| 6,431,296 B1 | 8/2002 | Won |
| 6,446,718 B1 | 9/2002 | Barrett et al. |
| 6,450,104 B1 | 9/2002 | Grant et al. |
| 6,477,444 B1 | 11/2002 | Bennett et al. |
| 6,484,083 B1* | 11/2002 | Hayward et al. ............... 701/50 |
| 6,488,306 B1* | 12/2002 | Shirey et al. ................. 280/474 |
| 6,505,896 B1 | 1/2003 | Boivin et al. |
| 6,512,345 B2* | 1/2003 | Borenstein et al. ...... 318/568.12 |
| 6,523,629 B1 | 2/2003 | Buttz et al. |
| 6,529,806 B1 | 3/2003 | Licht |
| 6,535,793 B2 | 3/2003 | Allard |
| 6,540,310 B1 | 4/2003 | Cartwright |
| 6,557,954 B1 | 5/2003 | Hattori |
| 6,563,084 B1 | 5/2003 | Bandy et al. |
| 6,574,958 B1 | 6/2003 | Macgregor |
| 6,576,406 B1 | 6/2003 | Jacobsen et al. |
| 6,595,812 B1 | 7/2003 | Haney |
| 6,610,007 B2 | 8/2003 | Belson et al. |
| 6,619,146 B2 | 9/2003 | Kerrebrock |
| 6,636,781 B2 | 10/2003 | Shen et al. |
| 6,651,804 B2 | 11/2003 | Thomas et al. |
| 6,652,164 B2 | 11/2003 | Stiepel et al. |
| 6,668,951 B2 | 12/2003 | Won |
| 6,708,068 B1 | 3/2004 | Sakaue |
| 6,715,575 B2 | 4/2004 | Karpik |
| 6,725,128 B2 | 4/2004 | Hogg et al. |
| 6,772,673 B2 | 8/2004 | Seto et al. |
| 6,773,327 B1 | 8/2004 | Felice |
| 6,774,597 B1 | 8/2004 | Borenstein |
| 6,799,815 B2 | 10/2004 | Krishnan et al. |
| 6,820,653 B1 | 11/2004 | Schempf et al. |
| 6,831,436 B2 | 12/2004 | Gonzalez |
| 6,835,173 B2 | 12/2004 | Couvillon, Jr. |
| 6,837,318 B1 | 1/2005 | Craig et al. |
| 6,840,588 B2 | 1/2005 | Deland et al. |
| 6,866,671 B2 | 3/2005 | Tierney |
| 6,870,343 B2* | 3/2005 | Borenstein et al. ...... 318/568.16 |
| 6,917,176 B2 | 7/2005 | Schempf et al. |
| 6,936,003 B2 | 8/2005 | Iddan |
| 6,959,231 B2 | 10/2005 | Maeda |
| 7,020,701 B1 | 3/2006 | Gelvin et al. |
| 7,040,426 B1 | 5/2006 | Berg |
| 7,044,245 B2 | 5/2006 | Anhalt et al. |
| 7,069,124 B1 | 6/2006 | Whittaker et al. |
| 7,090,637 B2 | 8/2006 | Dankitz |
| 7,137,465 B1 | 11/2006 | Kerrebrock |
| 7,144,057 B1 | 12/2006 | Young et al. |
| 7,171,279 B2 | 1/2007 | Buckingham et al. |
| 7,188,473 B1 | 3/2007 | Asada |
| 7,188,568 B2 | 3/2007 | Stout |
| 7,228,203 B2 | 6/2007 | Koselka et al. |
| 7,235,046 B2 | 6/2007 | Anahlt et al. |
| 7,331,436 B1 | 2/2008 | Pack et al. |
| 7,387,179 B2 | 6/2008 | Anhalt et al. |
| 7,415,321 B2 | 8/2008 | Okazaki et al. |
| 7,475,745 B1 | 1/2009 | DeRoos |
| 7,546,912 B1 | 6/2009 | Pack et al. |
| 7,597,162 B2 | 10/2009 | Won |
| 7,600,592 B2 | 10/2009 | Goldenberg et al. |
| 7,645,110 B2 | 1/2010 | Ogawa et al. |
| 7,654,348 B2 | 2/2010 | Ohm et al. |
| 7,775,312 B2* | 8/2010 | Maggio ........................ 180/164 |
| 7,798,264 B2 | 9/2010 | Hutcheson et al. |
| 7,843,431 B2* | 11/2010 | Robbins et al. ............... 345/161 |
| 7,860,614 B1 | 12/2010 | Reger |
| 7,974,736 B2 | 7/2011 | Morin et al. |
| 2001/0037163 A1 | 11/2001 | Allard |
| 2002/0128714 A1 | 9/2002 | Manasas et al. |
| 2002/0140392 A1 | 10/2002 | Borenstein |
| 2003/0000747 A1 | 1/2003 | Sugiyama et al. |
| 2003/0069474 A1 | 4/2003 | Couvillon, Jr. |
| 2003/0097080 A1 | 5/2003 | Esashi et al. |
| 2003/0110938 A1 | 6/2003 | Seto et al. |
| 2003/0223844 A1 | 12/2003 | Schiele et al. |
| 2004/0030571 A1 | 2/2004 | Solomon |
| 2004/0099175 A1 | 5/2004 | Perrot et al. |
| 2004/0103740 A1 | 6/2004 | Townsend et al. |
| 2004/0168837 A1 | 9/2004 | Michaud et al. |
| 2004/0216931 A1 | 11/2004 | Won |
| 2004/0216932 A1 | 11/2004 | Giovanetti et al. |
| 2005/0007055 A1* | 1/2005 | Borenstein et al. ...... 318/568.12 |
| 2005/0027412 A1 | 2/2005 | Hobson et al. |
| 2005/0085693 A1 | 4/2005 | Belson |
| 2005/0107669 A1 | 5/2005 | Couvillon, Jr. |
| 2005/0166413 A1 | 8/2005 | Crampton |
| 2005/0168068 A1 | 8/2005 | Courtemanche et al. |
| 2005/0168070 A1 | 8/2005 | Dandurand |
| 2005/0225162 A1 | 10/2005 | Gibbins |
| 2005/0235898 A1 | 10/2005 | Hobson et al. |
| 2005/0235899 A1 | 10/2005 | Yamamoto et al. |
| 2005/0288819 A1 | 12/2005 | de Guzman |
| 2006/0000137 A1 | 1/2006 | Valdivia y Alvarado et al. |
| 2006/0005733 A1 | 1/2006 | Rastegar et al. |
| 2006/0010702 A1 | 1/2006 | Roth et al. |
| 2006/0070775 A1 | 4/2006 | Anhalt et al. |
| 2006/0156851 A1 | 7/2006 | Jacobsen et al. |
| 2006/0225928 A1* | 10/2006 | Nelson ........................ 180/9.44 |
| 2006/0229773 A1 | 10/2006 | Peretz |
| 2007/0029117 A1* | 2/2007 | Goldenberg et al. ......... 180/9.32 |
| 2007/0156286 A1 | 7/2007 | Yamauchi |
| 2007/0193790 A1* | 8/2007 | Goldenberg et al. ........... 180/9.1 |
| 2007/0260378 A1 | 11/2007 | Clodfelter |
| 2008/0115687 A1 | 5/2008 | Gal |
| 2008/0164079 A1 | 7/2008 | Jacobsen |
| 2008/0168070 A1 | 7/2008 | Naphade et al. |
| 2008/0215185 A1 | 9/2008 | Jacobsen |
| 2008/0272647 A9* | 11/2008 | Hirose et al. .................. 305/167 |
| 2008/0284244 A1 | 11/2008 | Hirose et al. |
| 2009/0035097 A1 | 2/2009 | Loane |
| 2009/0171151 A1 | 7/2009 | Choset et al. |
| 2010/0030377 A1 | 2/2010 | Unsworth |
| 2010/0201185 A1 | 8/2010 | Jacobsen |
| 2010/0317244 A1 | 12/2010 | Jacobsen |
| 2010/0318242 A1 | 12/2010 | Jacobsen |

FOREIGN PATENT DOCUMENTS

| | | |
|---|---|---|
| CN | 1603068 A | 4/2005 |
| CN | 2774717 | 4/2006 |
| CN | 1 970 373 | 5/2007 |
| DE | 3025840 | 2/1982 |
| DE | 3626238 | 2/1988 |
| DE | 19617852 | 10/1997 |
| DE | 19714464 | 10/1997 |
| DE | 197 04 080 | 8/1998 |
| DE | 100 18 075 | 1/2001 |
| DE | 102004010089 | 9/2005 |
| EP | 0 105 418 | 4/1984 |
| EP | 0584520 | 3/1994 |
| EP | 0 818 283 | 1/1998 |
| EP | 0 924 034 | 6/1999 |
| EP | 1 444 043 | 8/2004 |
| EP | 1 510 896 | 3/2005 |
| EP | 1 832 502 | 9/2007 |
| EP | 1832501 | 9/2007 |
| FR | 2638813 | 5/1990 |
| FR | 2 850 350 | 7/2004 |
| GB | 1199729 | 7/1970 |
| JP | 52 57625 | 5/1977 |
| JP | 58-89480 | 5/1983 |
| JP | 60015275 | 1/1985 |
| JP | 60047771 | 3/1985 |
| JP | 60060516 | 4/1985 |
| JP | 60139576 | 7/1985 |
| JP | 61 001581 | 1/1986 |
| JP | 61089182 | 5/1986 |
| JP | 63306988 | 12/1988 |
| JP | 04092784 | 3/1992 |
| JP | 05147560 | 6/1993 |
| JP | 06-115465 | 4/1994 |
| JP | 03 535508 | 6/2004 |
| JP | 2005 111595 | 4/2005 |
| WO | WO97/26039 | 7/1997 |
| WO | WO 00/10073 | 2/2000 |
| WO | WO 02/16995 | 2/2002 |
| WO | WO03/030727 | 4/2003 |
| WO | WO 03/037515 | 5/2003 |
| WO | WO2005/018428 | 3/2005 |

| WO | WO 2006 068080 | 6/2006 |
| WO | WO 2008/049050 | 4/2008 |
| WO | WO 2008/076194 | 6/2008 |
| WO | WO 2008/135978 | 11/2008 |
| WO | WO 2009/009673 | 1/2009 |

OTHER PUBLICATIONS

Jacobsen, Stephen, U.S. Appl. No. 11/985,320, filed Nov. 13, 2007.
Jacobsen, Stephen, U.S. Appl. No. 11/985,346, filed Nov. 13, 2007.
Jacobsen, Stephen, U.S. Appl. No. 11/985,324, filed Nov. 13, 2007.
Jacobsen, Stephen, U.S. Appl. No. 11/985,323, filed Nov. 13, 2007.
Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.
Ren Luo "Development of a multibehavior-based mobile robot for remote supervisory control through the internet" IEEE/ ASME Transactions on mechatronics, IEEE Service Center, Piscataway, NY, Dec. 1, 2000, vol. 5, No. 4.
Nilas Sueset et al., "A PDA-based high-level human-robot interaction" Robotics, Automation and Mechatronics, IEEE Conference Singapore, Dec. 1-3, 2004, vol. 2, pp. 1158-1163.
U.S. Appl. No. 12/765,618, filed Apr. 22, 2010; Stephen C. Jacobsen; office action issued Apr. 6, 2011.
U.S. Appl. No. 11/985,320; filed Nov. 13, 2007; Stephen C. Jacobsen; office action issued Apr. 12, 2011.
U.S. Appl. No. 12/694,996, filed Jan. 27, 2010; Stephen C. Jacobsen; office action issued Sep. 30, 2010.
U.S. Appl. No. 12/151,730, filed May 7, 2008; Stephen C. Jacobsen; office action issued Nov. 15, 2010.
U.S. Appl. No. 12/171,144, filed Jul. 10, 2008; Stephen C. Jacobsen; office action issued Aug. 11, 2010.
U.S. Appl. No. 11/985,324, filed Nov. 13, 2007; Stephen C. Jacobsen; office action issued Nov. 1, 2010.
U.S. Appl. No. 12/820,881, filed Jun. 22, 2010; Stephen C. Jacobsen, office action issued Nov. 30, 2010.
US Application PCT/US10/38331; filed Jun. 11, 2009; Stephen C. Jacobsen; ISR issued Dec. 1, 2010.
Matthew Heverly & Jaret Matthews: "A wheel-on-limb rover for lunar operation" Internet article, Nov. 5, 2008, pp. 1-8, http://robot-ics.estec.esa.int/i-SAIRAS/Isairas2008/Proceedings/SES-SION%2026/m116-Heverly.pdf.
NASA: "Nasa's newest concept vehicles take off-roading out of this world" Internet article, Nov. 5, 2008, http://www.nasa.gov/mission_pages/constellation/main/lunar_truck.html.
Revue Internationale De defense, "3-D vision and urchin" Oct. 1, 1988, p. 1292, vol. 21, No. 10, Geneve CH.
Advertisement, International Defense review, Jane's information group, Nov. 1, 1990, p. 54, vol. 23, No. 11, Great Britain.
Hirose, et al., "Snakes and strings; new robotic components for rescue operations," International Journal of Robotics Research, Apr.-May 2004, pp. 341-349, vol. 23, No. 4-5.
Paap et al., "A robot snake to inspect broken buildings," IEEE, 2000, pp.. 2079-2082, Japan.

Braure, Jerome, "Participation to the construction of a salamander robot: exploration of the morphological configuration and the locomotion controller", Biologically Inspired Robotics Group, master thesis, Feb. 17, 2004, pp. 1-46.
Jacobsen, et al., Advanced intelligent mechanical sensors (AIMS), Proc. IEEE Trandsucers 1991, Jun. 24-27, abstract only, San Fransico, CA.
Jacobsen, et al., "Research robots for applications in artificial intelligence, teleoperation and entertainment", International Journal of Robotics Research, 2004, pp. 319-330, vol. 23.
Jacobsen, et al., "Multiregime MEMS sensor networks for smart structures," Procs. SPIE 6th Annual Inter. Conf. on Smart Structues and Materials, Mar. 1-5, 1999, pp. 19-32, vol. 3673, Newport Beach CA.
MaClean et al., "A digital MEMS-based strain gage for structural health monitoring," Procs. 1997 MRS Fall Meeting Symposium, Nov. 30-Dec. 4, 1997, pp. 309-320, Boston Massachusetts.
Berlin et al., "MEMS-based control of structural dynamic instability", Journal of Intelligent Material Systems and Structures, Jul. 1998 pp. 574-586, vol. 9.
Goldfarb, "Design and energetic characterization of a liquid-propellant-powered actuator for self-powered robots," IEEE Transactions On Mechatronics, Jun. 2003, vol. 8 No. 2.
Dowling, "Limbless Locomotion: Learning to crawl with a snake robot," The Robotics Institute at Carnegie Mellon University, Dec. 1997, pp. 1-150.
Jacobsen, Stephen, U.S. Appl. No. 12/171,144, filed Jul. 10, 2008.
Jacobsen, Stephen, U.S. Appl. No. 12/171,146, filed Jul. 10, 2008.
Jacobsen, Stephen, U.S. Appl. No. 12/151,730, filed May 7, 2008.
Jacobsen, Stephen, U.S. Appl. No. 12/117,233, filed May 8, 2008.
Jacobsen, Stephen, U.S. Appl. No. 11/293,701, filed Dec. 1, 2005.
Jacobsen, Stephen, U.S. Appl. No. 12/350,693, filed Jan. 8, 2009.
U.S. Appl. No. 12/171,144, filed Jul. 10, 2008; Stephen C. Jacobsen; office action mailed Jan. 13, 2011.
U.S. Appl. No. 12/694,996, filed Jan. 27, 2010; Stephen C. Jacobsen; office action mailed Jan. 26, 2011.
PCT Application PCT/US2010/038339; filing date Jun. 11, 2010; Stephen C. Jacobsen; ISR mailed Feb. 9, 2011.
Jacobsen, U.S. Appl. No. 12/694,996, filed Jan. 27, 2010.
U.S. Appl. No. 12/765,618, filed Apr. 22, 2010; Stephen C. Jacobsen; office action issued Sep. 20, 2011.
U.S. Appl. No. 12/350,693, filed Jan. 8, 2009; Stephen C. Jacobsen; office action issued Oct. 12, 2011.
U.S. Appl. No. 11/985,320, filed Nov. 13, 2007; Stephen C. Jacobsen; office action issued Nov. 25, 2011.
U.S. Appl. No. 11/985,320, filed Nov. 13, 2007; Stephen C. Jacobsen; office action mailed Aug. 17, 2011.
U.S. Appl. No. 12/820,881, filed Jun. 22, 2010; Stephen C. Jacobsen; notice of allowance issued Jun. 9, 2011.
U.S. Appl. No. 12/814,302; filed Jun. 11, 2010; Stephen C. Jacobsen; office action issued Jan. 10, 2012.
U.S. Appl. No. 12/171,146, filed Jul. 10, 2008; Stephen C. Jacobsen; office action issued Feb. 9, 2012.
U.S. Appl. No. 12/765,618; filed Apr. 22, 2010; Stephen C. Jacobsen; notice of allowance issued Feb. 2, 2012.

* cited by examiner

TRACKED ROBOTIC CRAWLER HAVING A MOVEABLE ARM

This application claims priority to U.S. Provisional Patent Application No. 60/858,915, filed Nov. 13, 2006 in the United States Patent and Trademark Office, and entitled, "Tracked Robotic Crawler Having A Moveable Arm," which application is incorporated by reference in its entirety herein.

RELATED APPLICATIONS

This invention was made with government support under HR0011-04-C-0147 awarded by the Department of Defense Advanced Research Projects Agency (DARPA). The government has certain rights in the invention.

FIELD OF THE INVENTION

The present invention relates to small, unmanned ground robotic vehicles. More particularly, the present invention relates to a tracked robotic crawler having at least one moveable arm.

BACKGROUND OF THE INVENTION AND RELATED ART

Robotics is an active area of research, and many different types of robotic vehicles have been developed for various tasks. For example, unmanned aerial vehicles have been quite successful in military aerial reconnaissance. Less success has been achieved with unmanned ground vehicles, however, in part because the ground environment is significantly more difficult to traverse than the airborne environment.

Unmanned ground vehicles face many challenges when attempting mobility. Terrain can vary widely, including for example, loose and shifting materials, obstacles, vegetation, limited width or height openings, steps, and the like. A vehicle optimized for operation in one environment may perform poorly in other environments.

There are also tradeoffs associated with the size of vehicle. Large vehicles can handle some obstacles better, including for examples steps, drops, gaps, and the like. On the other hand, large vehicles cannot easily negotiate narrow passages or crawl inside pipes, and are more easily deterred by vegetation. Large vehicles also tend to be more readily spotted, and thus are less desirable for discrete surveillance applications. In contrast, while small vehicles are more discrete, surmounting obstacles becomes a greater navigational challenge.

A variety of mobility configurations have been adopted to traverse difficult terrain. These options include legs, wheels, and tracks. Legged robots can be agile, but use complex control mechanisms to move and achieve stability. Wheeled vehicles can provide high mobility, but provide limited traction and require width in order to achieve stability.

Tracked vehicles are known in the art and have traditionally been configured in a tank-like configuration. While tracked vehicles can provide a high degree of stability in some environments, tracked vehicles typically provide limited maneuverability with very small vehicles. Furthermore, known tracked vehicles are unable to accommodate a wide variety of obstacles, particularly when the terrain is narrow and the paths are tortuous and winding.

SUMMARY OF THE INVENTION

The present invention includes a robotic crawler which helps to overcome problems and deficiencies inherent in the prior art. The robotic crawler includes at least one frame unit which has a continuous track rotatably coupled to the frame unit with at least one surface of the continuous track being exposed to enable engagement with a surface for propulsion of the frame unit. Disposed on the frame unit is at least one arm. The arm is moveable relative to the frame unit.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, can be arranged and designed in a wide variety of different configurations. Nonetheless, the invention will be described and explained with additional specificity and detail through the use of the accompanying drawings in which:

FIGS. 11(a)-11(g) illustrate a side view of a sequence of movements of a tracked robotic crawler climbing a set of stairs in accordance with an embodiment of the present invention.

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Figure 1:
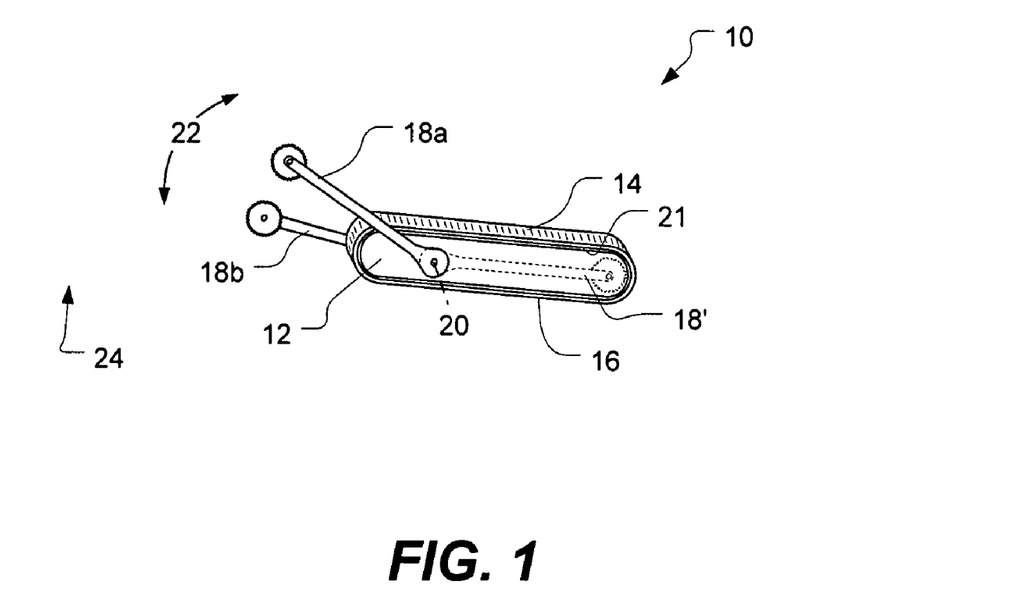
FIG. 1 illustrates a perspective view of a tracked robotic crawler according to an exemplary embodiment of the present invention.

With reference to FIG. 1, shown is an illustration of a tracked robotic crawler according to a first exemplary embodiment of the present invention. Specifically, FIG. 1 illustrates the tracked robotic crawler 10 as including a frame unit 12 having a continuous track 14. More than one continuous track can be included in the frame, if desired. At least one surface 16 of the continuous track is exposed to enable engagement with a surface for propulsion of the frame unit. Attached to the frame unit on opposite sides are at least two articulated arms 18a, 18b. The articulated arms are moveable independently of each other in at least one dimension. For example, the articulated arms can mounted on a common axis 20, providing rotational movement in direction 22. Each articulated arm is thus moveable in a plane parallel to the side of the frame unit. In other words, the articulated arm is moveable in a plane perpendicular to an axis of rotation of the continuous track of the frame unit. The frame unit can be substantially enclosed inside a perimeter defined by an inner surface of the continuous track, helping to maintain a small profile. It will be understood, of course, that portions of the frame may extend laterally to connect to joints or other features of the tracked robotic crawler. Various other arrangements of articulated arms can be used as described further below.

The articulated arms can be used to aid in propulsion of the tracked robotic crawler 10. The articulated arms can be rotated to a position extending past the front end of the frame unit, for example, to help lift the front end of the frame unit over an obstacle. The articulated arms can also be rotated into a stowed position (for example, as shown by dotted lines 18') where they are substantially contained within the perimeter defined by an inner surface 21 of the continuous track.

A small profile is thus obtained when the arms are stowed, enhancing the ability of the tracked robotic crawler to fit through narrow passages, pass through vegetative obstructions, and maintain an inconspicuous appearance. Various other movement modes are described in further detail below.

Figure 2:
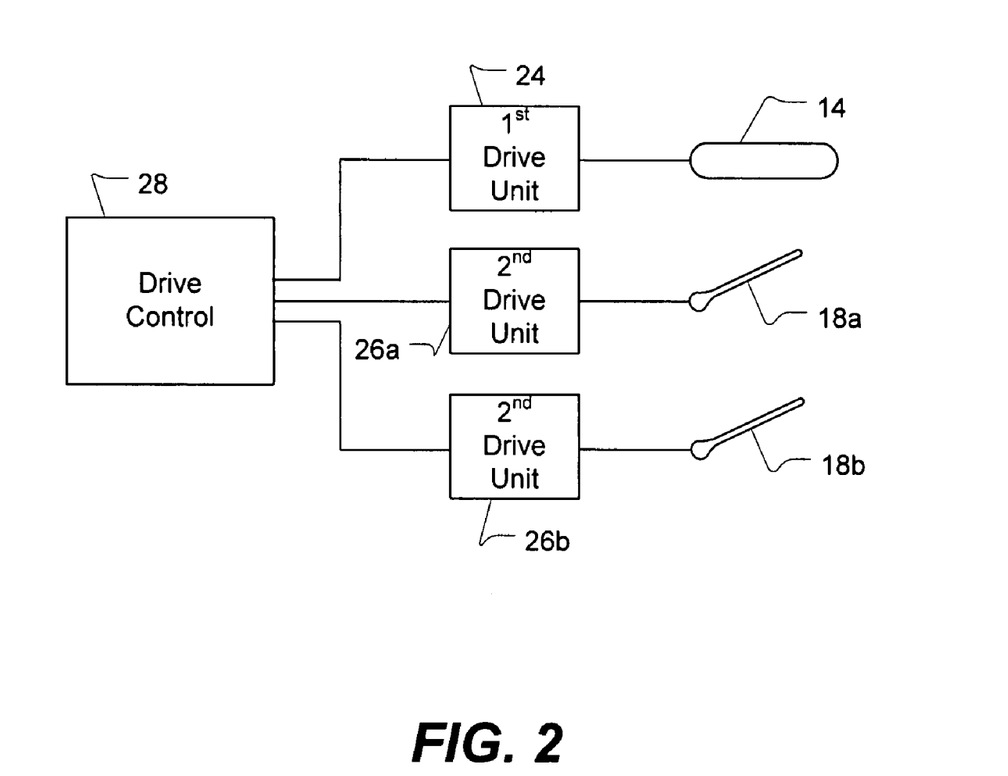
FIG. 2 illustrates a schematic diagram of the tracked robotic crawler of FIG. 1.

As shown in schematic form in FIG. 2, the tracked robotic crawler 10 can include a track drive unit 24 coupled to the continuous track 14, and one or more arm drive units 26a, 26b coupled respectively to the articulated arms 18a, 18b. The track drive unit can control motion of the continuous track, for example, controlling the direction (forward or reverse) and speed of movement. The arm drive units can control motion of the articulated arms. Propulsion of the tracked robotic crawler can include coordinated movement of the continuous track and the articulated arms as will be discussed in further detail below.

Figure 3:
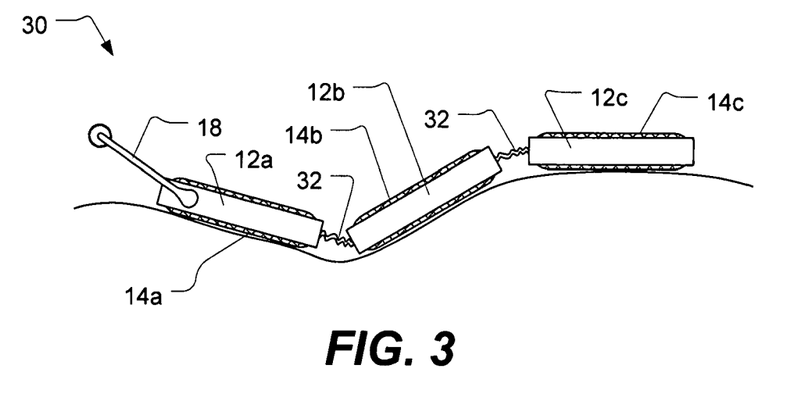
FIG. 3 illustrates a perspective view of a tracked robotic crawler according to another exemplary embodiment of the present invention.

A tracked robotic crawler can also include multiple frame units, as illustrated in FIG. 3 in accordance with another embodiment of the present invention. A tracked robotic crawler 30 includes a plurality of frame units 12a, 12b, 12c coupled in a series configuration in a train-like arrangement. Each frame unit includes a continuous track 14a, 14b, 14c, as described above. The frame units are coupled through joints 32. For example, the joints can be passive or actuated joints. Actuated joints are discussed in further detail below.

One or more of the frames 14 can include at least one articulated arm 18. For example, a single armed frame unit can have an articulated arm, with other frames being armless. As another example, each frame unit can have one or more arms. As yet another example, the first and last frame unit within the train can have arms, and intermediate units can be armless. Articulated arms can be coupled to the frames at various locations, including for example, near the front, near the back, or near the center. One particularly useful embodiment is where an articulated arm is located near one end (e.g., the front) of a frame unit, and the joint 32 is connected near the other end (e.g., the rear) of the frame unit.

Although three frame units are shown, more units can be coupled together into longer trains using additional joints. Improved mobility and agility can be obtained using two or more frame units coupled in series, as will be described further below.

Figure 4:
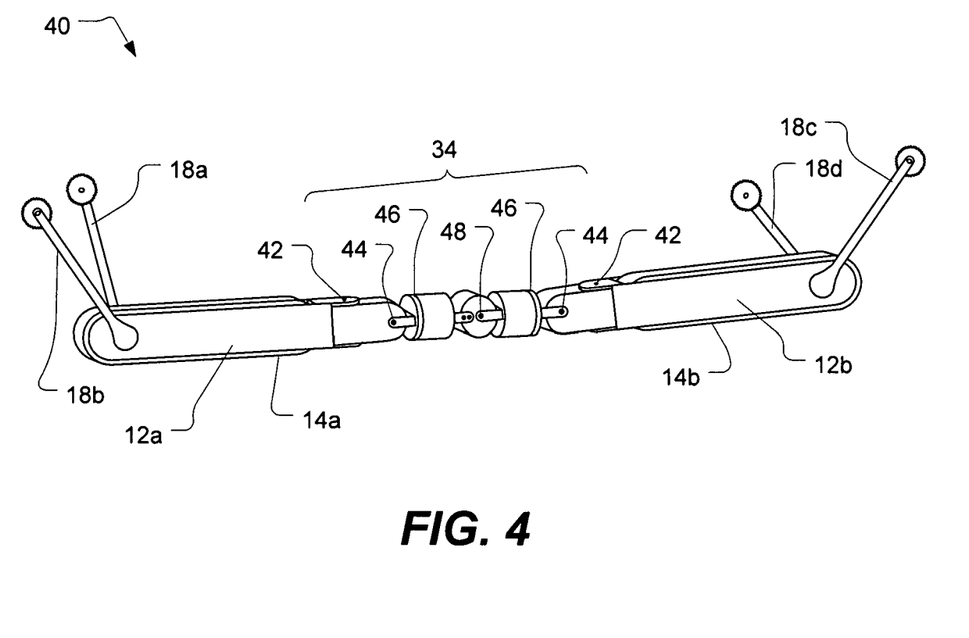
FIG. 4 illustrates a perspective view of a tracked robotic crawler according to another exemplary embodiment of the present invention.

One particular exemplary robotic crawler is shown in FIG. 4 in accordance with another embodiment of the present invention. The tracked robotic crawler 40 includes a first frame unit 12a and a second frame unit 12b, the frame units having continuous tracks 14a, 14b as described above. Articulated arms 18a, 18b, 18c, 18d are disposed in opposing pairs on each frame unit. The first frame unit and second frame unit are coupled by an actuated linkage 34. The actuated linkage provides controllable bending about at least one axis. For example, the actuated linkage can include joints providing bending about seven different axes as shown here. Two joints providing bending about a yaw axis 42, two joints provide bending about a pitch axis 44, two joints providing rotation about a roll axis 46 and one additional bending joint 48 is included. This particular arrangement of joints provides significant flexibility in the pose that the tracked robotic crawler can assume. For example, commonly owned U.S. Provisional Patent Application No. 60/858,917, entitled "Serpentine Robotic Crawler", filed Nov. 13, 2006 and herein incorporated by reference, describes various poses and movement moves enabled by this particular arrangement of joints.

Figure 5:
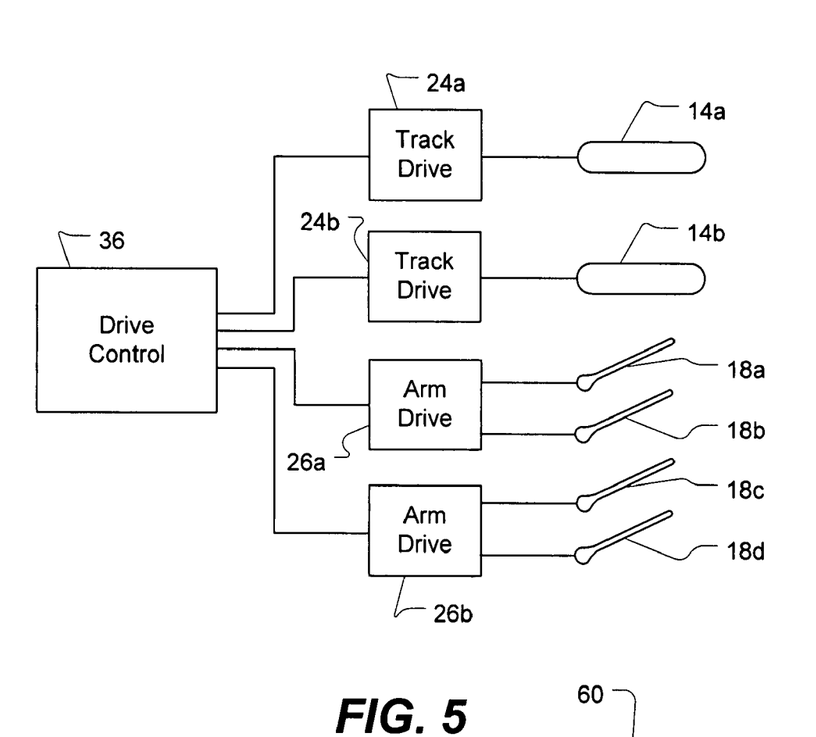
FIG. 5 illustrates a schematic diagram of the tracked robotic crawler of FIG. 4.

As shown in schematic form in FIG. 5, the tracked robotic crawler 40 includes track drive units 24a, 24b coupled respectively to the continuous tracks 14a, 14b. Also included are arm drive units 26a, 26b. Each arm drive unit 26a, 26b controls a pair of arms, 18a, 18b and 18c, 18d, respectively, although alternately separate drive units can also be provided for each arm. A drive control system 36 is coupled to the drive units to coordinate movement of the continuous tracks and arms to provide propulsion of the tracked robotic crawler. The actuated linkage 34 can also be coupled to the drive control system to coordinate movement and pose of the tracked robotic crawler.

Various movement modes and poses are possible for a tracked robotic crawler. Examples will now be provided with reference to the configuration illustrated in FIG. 4, although it will be appreciated that other configurations disclosed herein are also capable of some or all of the below described movement modes.

Figure 6:
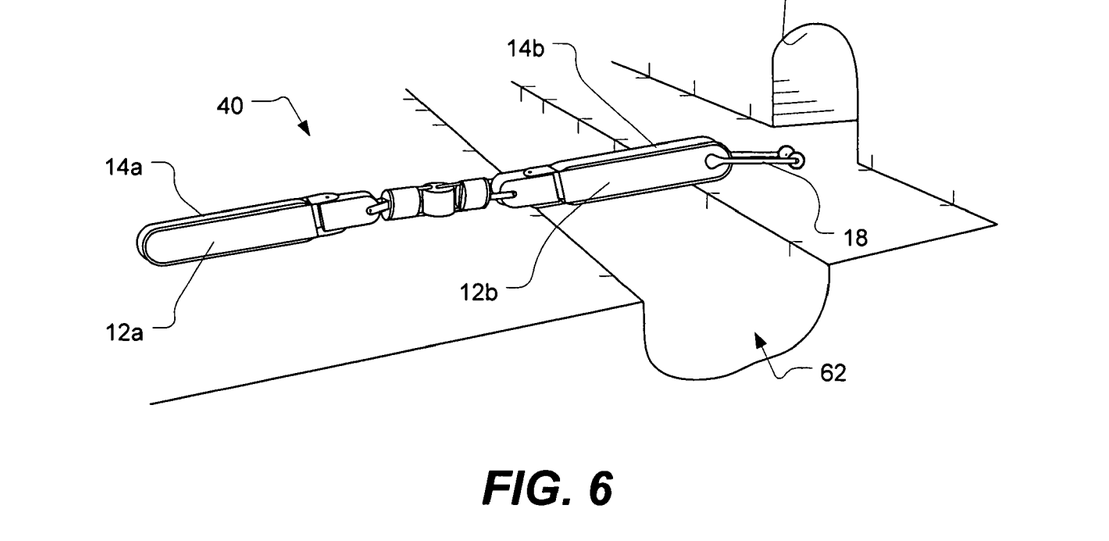
FIG. 6 illustrates a perspective view of a tracked robotic crawler in a train configuration crossing a gap in accordance with an embodiment of the present invention.

A first pose will be referred to herein as the "train" configuration where the first frame 12a and second frame 12b are positioned in line as illustrated in FIG. 6. The frames can be, but need not be, aligned in a line. The train configuration provides a small profile, allowing narrow passages and openings (e.g., tunnel 60) to be passed through. The tracked robotic crawler can be moved in a forward and reverse direction by driving the continuous tracks 14a, 14b so they move in the same relative direction. Optionally, one continuous track can be driven and the other continuous track left in a passive mode.

The arms 18 can be deployed to extend beyond the ends of the frames to contact the surface and provide additional length to the tracked robotic crawler 40, for example, as illustrated in FIG. 6. The added length also provides additional stability. This enhances the ability of the tracked robotic crawler to cross gaps and holes (e.g., canyon 62).

Turning of the tracked robotic crawler 10 can be accomplished in a variety of ways. In one mode, the actuated linkage arm 34 can be operated to create an angle between the first frame 12a and the second frame 12b. In another mode, one or more of the arms 18 can be extended to dig into the surface to provide an off-center point (or points) of resistance which the frame(s) torques around as drive is applied to the continuous tracks 14. In another mode, operation of the actuated linkage arm, arms, and track can be coordinated to execute a turn.

Figure 7:
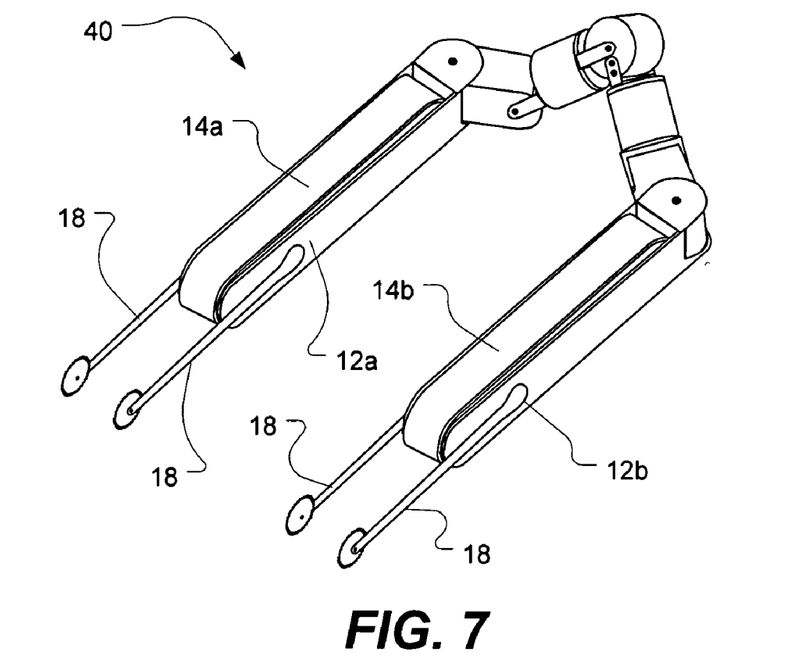
FIG. 7 illustrates a perspective view of a tracked robotic crawler in a tank configuration in accordance with an embodiment of the present invention.

A second pose will be referred to herein as the "tank" configuration, where the first frame 12a and second frame 12b are positioned side by side as illustrated in FIG. 7. The frames can be, but need not be, parallel. The tank configuration provides lateral stability to the tracked robotic crawler 40, for example when traversing a steep slope. The tracked robotic crawler can be moved in a forward and reserve direction by driving the continuous tracks 14a, 14b in the same relative direction, and turned by driving the continuous tracks in opposite directions. In general, moving the tracked robotic crawler in the tank-like configuration can involve applying different drive speeds (including opposite directions) to the continuous tracks. Note that, relative to the train configuration, the direction sense of one of the continuous tracks is reversed. In the tank configuration, the arms 18 can be extended to contact the surface to provide additional stability and/or traction.

Figure 8:
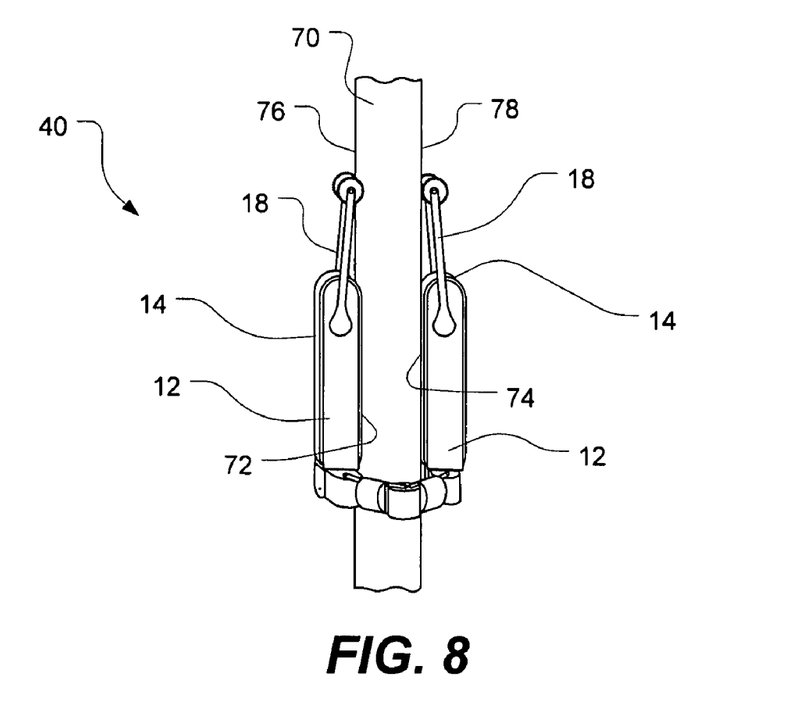
FIG. 8 illustrates a perspective view of a tracked robotic crawler in an outside-climbing configuration in accordance with an embodiment of the present invention.

The tracked robotic crawler can also be configured for climbing the exterior of structure in an outside-climbing configuration. As illustrated in FIG. 8, the tracked robotic crawler 40 is wrapped around the structure 70 so that exposed portions 72, 74 of the continuous tracks 14 face toward each other and contact opposite outer surfaces 76, 78 of the structure. The arms 18 can be extended past the ends of the frames 12 to contact the outer surface of the structure to provide additional stability and/or traction. For example, the arms can help to maintain the tracked robotic crawler centered on the structure.

The continuous tracks can be driven to move the tracked robotic crawler up and down the structure. Many different structural geometries, including for example a pole, can be climbed in this outside-climbing configuration.

Figure 9A:
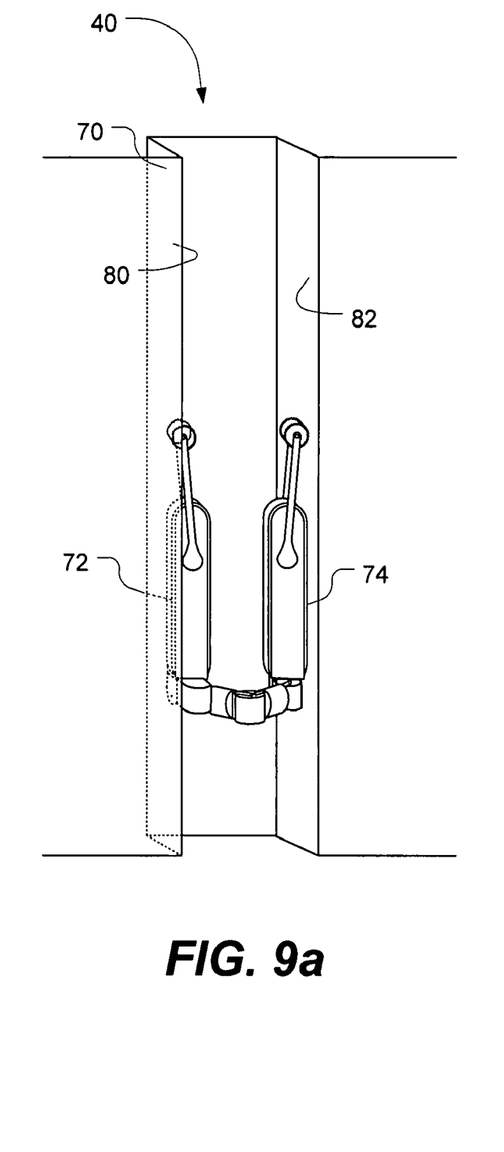
FIGS. 9(a) and 9(b) illustrate perspective views of a tracked robotic crawler in different inside-climbing configurations in accordance with an embodiment of the present invention.
Figure 9B:
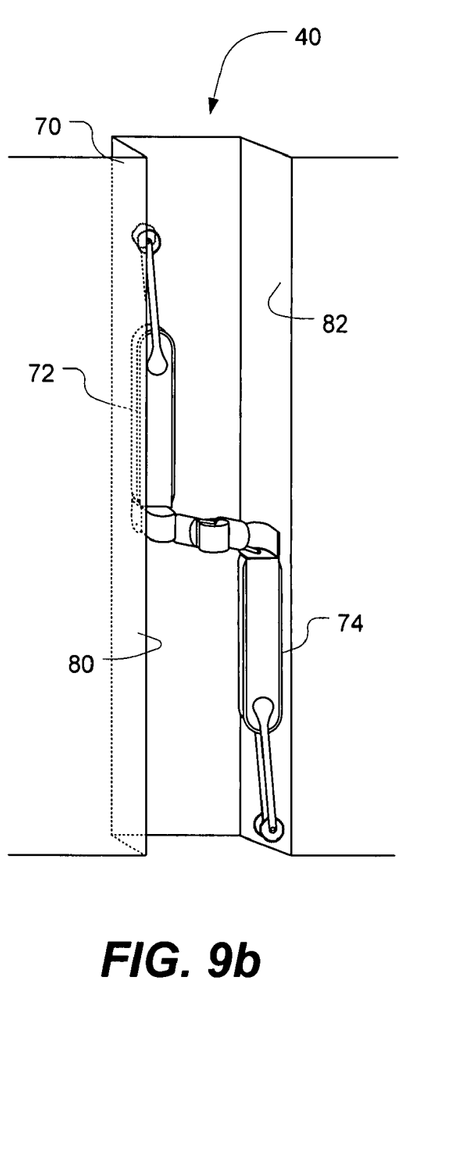
Figure 10A:
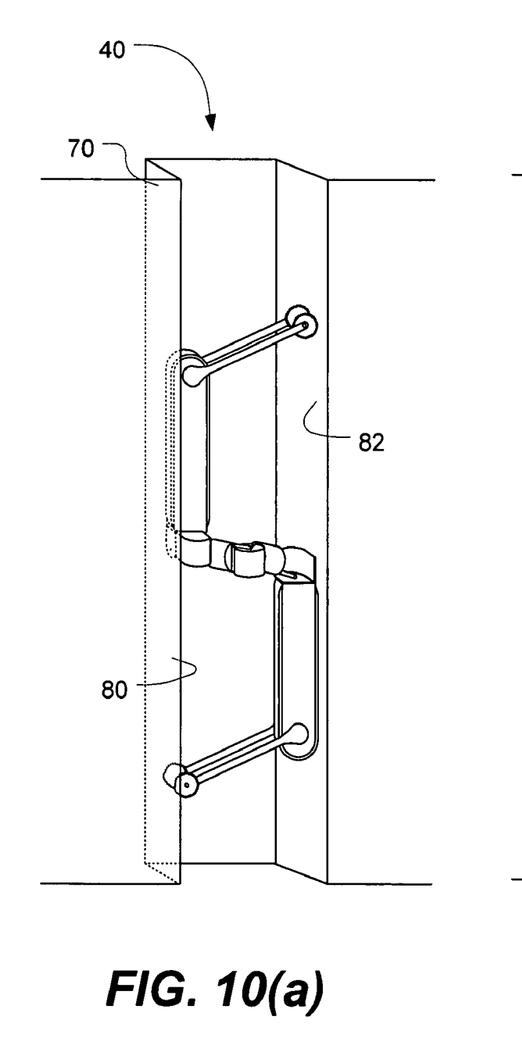
FIGS. 10(a) and 10(b) illustrate perspective views of a tracked robotic crawler in additional different inside-climbing configurations in accordance with an embodiment of the present invention.
Figure 10B:
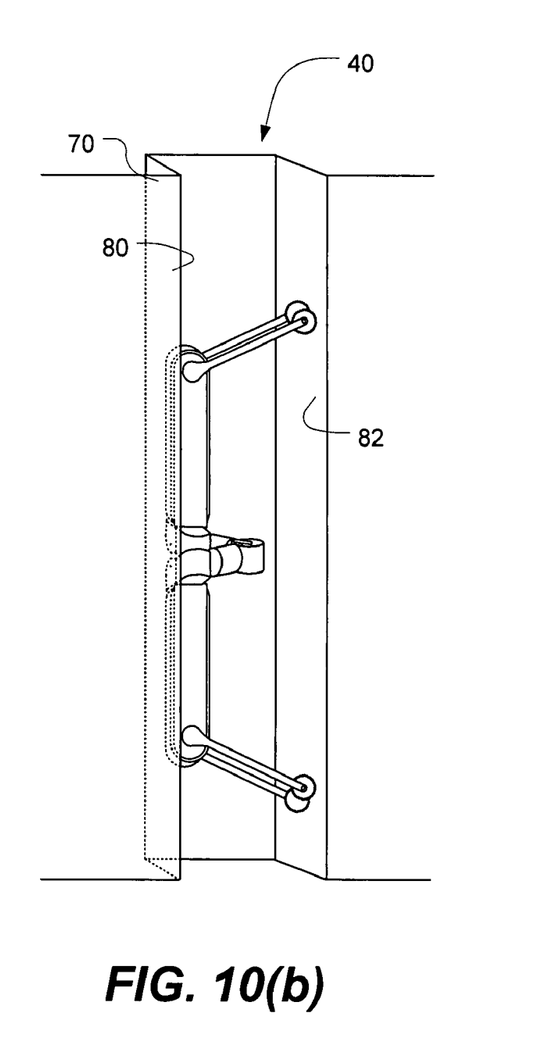

The tracked robotic crawler can also be configured for climbing the interior of a structure. FIGS. 9(a) and 9(b) illustrate two different inside-climbing configurations. In an inside-climbing configuration, the tracked robotic crawler 40 is configured so that exposed portions 72, 74 of the continuous tracks face away from each other and are in contact with opposite inner surfaces 80, 82 of the structure 70. The arms can be extended past the ends of the frames to contact the inner surface of the structure. The arms can be positioned to contact the same inner surface as their corresponding continuous track, as shown in FIGS. 9(a) and 9(b). Alternately, arms can be positioned to contact the opposite inner surface, as shown in the alternate pose of FIG. 10(a). As yet another alternative, as shown in FIG. 10(b), the continuous tracks can face the same direction in contact with one inner surface 80 and the arms can contact the opposite inner surface 82. In the various poses, the arms can help to increase force between the continuous track and the inner surface, increasing traction of the continuous track. The inside-climbing configurations can be useful for climbing pipes, chimneys, wall interiors, and the like.

Figure 11:
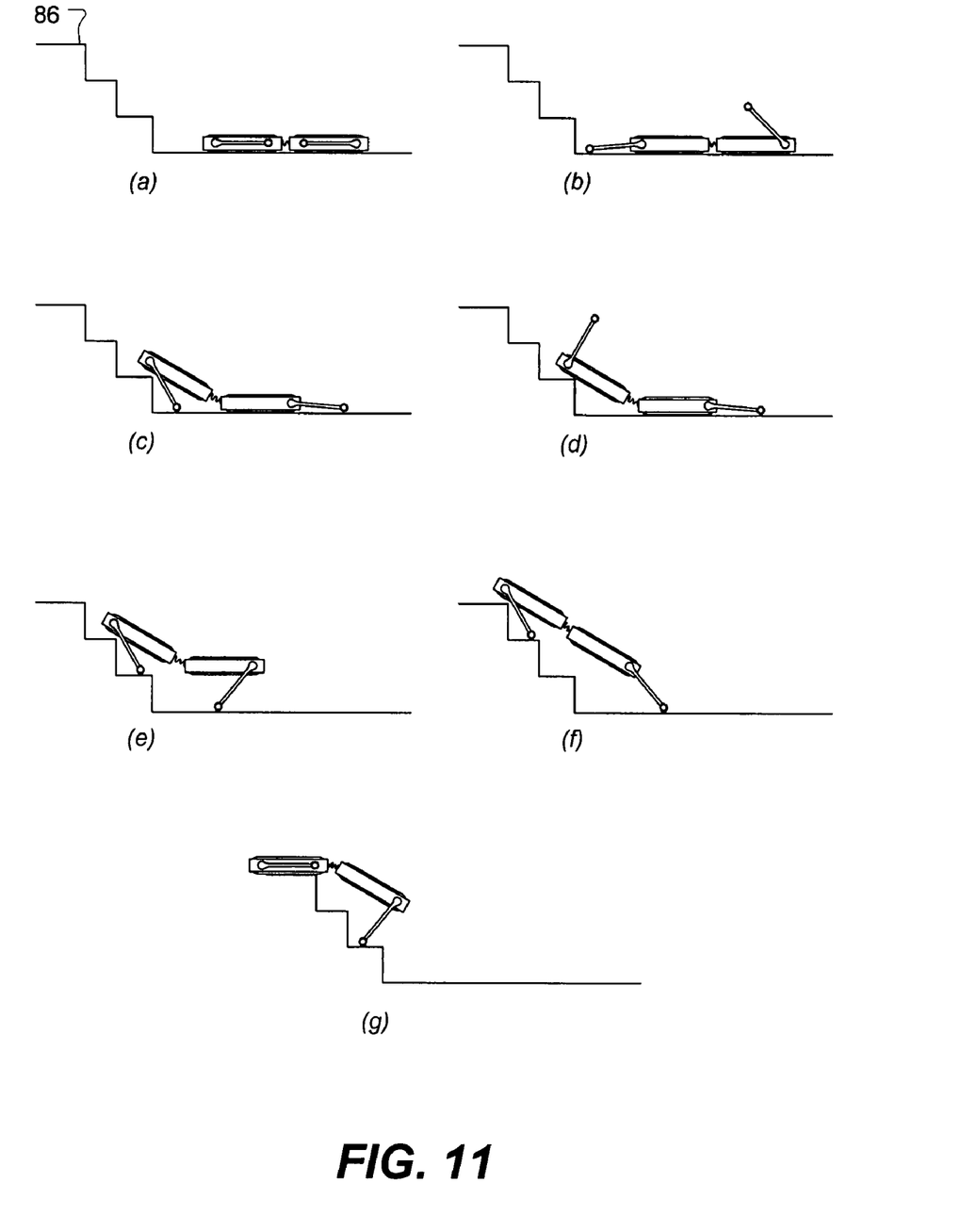

Various articulated movements are also possible for the tracked robotic crawler. For example, FIGS. 11(a)-11(i) provide a side view sequence of illustrations illustrating a tracked robotic crawler 40 climbing a set of stairs 86. The tracked robotic crawler assumes a train configuration, if it is not already in that pose, as shown in FIG. 11(a). The tracked robotic crawler then rotates the arms into a position, where the forward arms extend in front of the first frame, as shown in FIG. 11(b). The forward arms are then rotated further, to lift the front of the first frame to clear the first stair, as shown in FIG. 11(c). The rear arms can be rotated to contact the surface behind the tracked robotic crawler to provide additional stability and/or traction. The tracks can then be driven forward to move the tracked robotic crawler forward on the first stair, as shown in FIG. 11(d). To climb the next stair, the rotational sequence is repeated for the front arms. The rear arms can also be used to help lift the second frame, as shown in FIGS. 11(e)-11(g). In general, the arms are rotated, with the distal ends of the arms rotating in the direction of travel while above the frame unit, and rotating opposite the direction of travel while below the frame unit. This motion helps the arms to clear the obstacle, gain traction, and lift the frame unit over the obstacle. Accordingly, it is helpful if the arm drive units have sufficient torque to lift the weight of a frame unit. Alternately, the actuated linkage 34 can provide sufficient torque to lift the frame of the first frame unit, while supported by the second frame unit. It will be appreciated that similar motions as used for climbing a set of stairs can be used for the tracked robotic crawler to enter a hole in a wall. Various other combinations of articulated movement can prove helpful, depending on the dimensions of the stairs (or other obstacles) being navigated. Additional movement modes which can be employed in embodiments of the present invention are described in the above mentioned application entitled "Serpentine Robotic Crawler".

Figure 12:
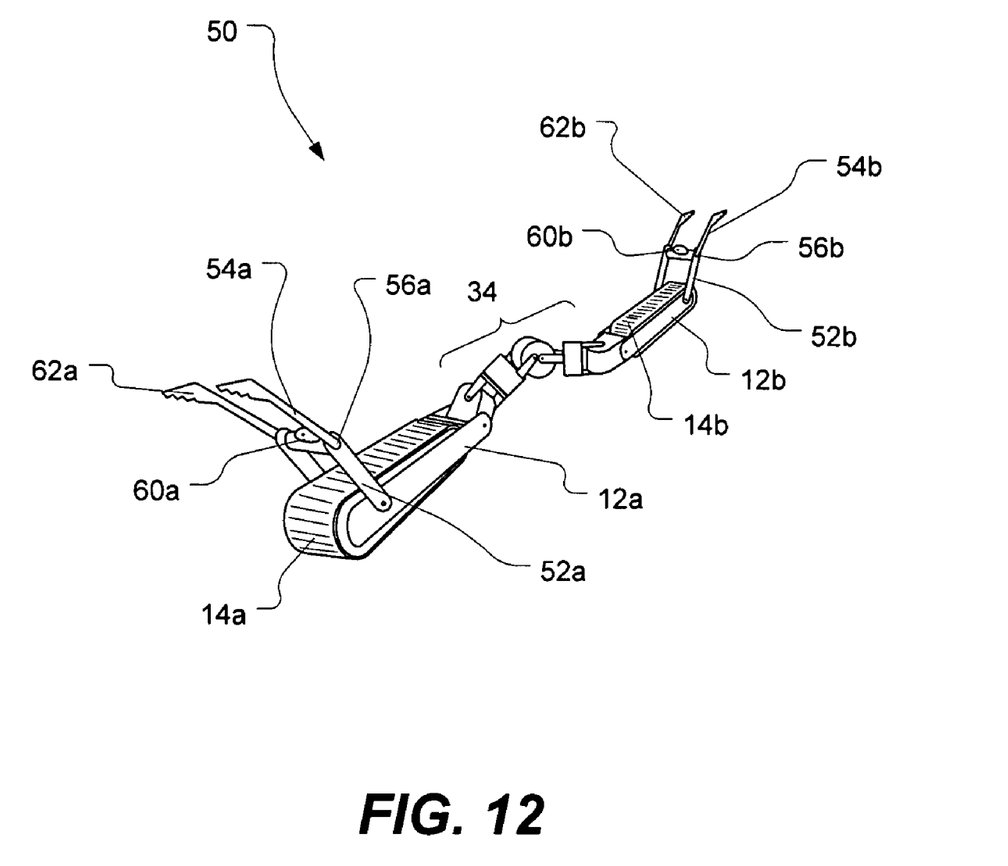
FIG. 12 illustrates a tracked robotic crawler in accordance with yet another alternate embodiment of the present invention.

Although the preceding discussion has focused generally on relatively simple configurations of the articulated arms, more complex arrangements can be used as well. For example, an articulated arm can include a plurality of articulated joints. For example, similar joints as used in the actuated linkage can also be used in the articulated arm. Various appendages, such as tools, cameras, and the like can also be affixed to the articulated arm. For example, FIG. 12 illustrates a tracked robotic crawler 50 in accordance with another embodiment of the present invention. The tracked robotic crawler includes frames 12a, 12b, each having a track 14a, 14b. Coupled to the frames are jointed arms having a lower segment 52a, 52b and an upper segment 54a, 54b, connected together by joint 56a, 56b. Each jointed arm includes a camera 60a, 60b. Affixed to the distal end of each arm is a serrated knife edge 62a, 62b.

The jointed arms can be used for multiple purposes. One purpose is support of the cameras 60a, 60b. The lower segments 52a, 52b can be rotated to raise or lower the camera, (e.g., to increase height to provide a better view or to reduce height to provide a lower profile). The upper segments 54a, 52b can be rotated to assist in propulsion, for example, as discussed above. The serrated knife edge 62a, 62b can help to provide traction, for example, when climbing stairs as discussed above.

The cameras can be used to assist in navigation. For example, a front camera 60a can be used primarily for scanning the environment, and a rear camera 60b can be used for observing the pose of the tracked robotic crawler for control purposes.

Of course, various other tools can be affixed to the end of the arms, including for example lights, clamps, grippers, manipulators, cutters, drills, material samplers, sensors, etc. Various sensors, including for example, radar, lidar, temperature sensors, chemical sensors, force sensors, motion detectors, microphones, antennas, and the like can be used.

In another embodiment, arms can be used which provide movement in two degrees of freedom. A first degree of freedom can be rotational movement in a plane tangent to the point of attachment to the frame, for example, as described above. A second degree of freedom can be lateral movement perpendicular to the plane. For example, an arm having joints or a structure with controllable compliance can be used to provide lateral movement. Controllable compliance can be obtained by providing a spring bias on the arms, where the spring constant can be varied during operation by an actuator.

Various additional movement modes are possible by moving the arms laterally. For example, the arms can be deflected inwardly and extended in front of the tracked robotic crawler to form a pointed arrangement. This pose can assist the tracked robotic crawler in passing through obstacles, such as dense vegetation.

As another example, the arms can be deflected inward toward each other to improve traction, for example, when grabbing onto a convex outside surface in a outside-climbing configuration. The arms can also be deflected outward, for example, when providing traction on a concave curved interior surface in an inside-climbing configuration. As yet another example, the arms can be deflected outward to form outriggers, providing additional stability to the tracked robotic crawler.

Summarizing and reiterating to some extent, tracked robotic crawlers in accordance with embodiments of the present invention can be deployed in a variety of applications and environments. For example, and not by way of limitation, applications can include search and rescue, military operations, and industrial operations. The tracked robotic crawler can help to avoid the need to expose humans to hazardous environments, such as unstable buildings, military conflict situations, and chemically, biologically, or nuclear contaminated environments. The configurational flexibility of the tracked robotic crawler can provide multiple movement modes. For example, movement in a tank-like configuration can provide high stability. Movement in a train-like configuration can provide access through narrow passages or pipes and allow bridging of gaps. Climbing the outside of structures (e.g., a pole) and climbing the inside of structures (e.g. a chimney) are also possible. Climbing stairs has also been illustrated.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Accordingly, the scope of the invention should be determined solely by the appended claims and their legal equivalents, rather than by the descriptions and examples given above.

What is claimed is:

1. A tracked robotic crawler comprising:
   a plurality of frame units, each frame unit having a continuous track rotatably coupled to the frame unit with at least one surface of the continuous track being exposed to enable engagement with a surface for propulsion of the frame unit;
   at least one actuated linkage coupling the frame units in a series configuration, the actuated linkage having at least one actuated joint configured to provide controllable bending about at least one axis; and
   at least one arm disposed on one of the plurality of frame units to form an armed frame unit, said at least one arm being movable relative to the armed frame unit in at least one dimension to extend beyond an end of the armed frame unit to assist in control of pose and movement of the tracked robotic crawler over the surface, wherein said at least one arm is selectively movable to a position out of contact with the surface.

2. The tracked robotic crawler of claim 1, wherein each of the frame units are substantially contained within a perimeter defined by an inner surface of their corresponding continuous track.

3. The tracked robotic crawler of claim 1, wherein the at least one arm is configured so that it can be moved into a stowed position where the at least one arm is substantially contained within a perimeter defined by an inner surface of the corresponding continuous track.

4. The tracked robotic crawler of claim 1, wherein the armed frame unit comprises:
   a first drive unit coupled to the continuous track;
   a second drive unit coupled to the at least one arm; and
   a drive control system coupled to the first and second drive units and configured to coordinate movement of the continuous track and the at least one arm to provide propulsion of the tracked robotic crawler.

5. The tracked robotic crawler of claim 4, wherein the at least one actuated linkage is coupled to the drive control system to coordinate movement and pose of the tracked robotic crawler.

6. The tracked robotic crawler of claim 1, wherein the at least one actuated linkage has sufficient torque to enable lifting of at least one of the frame units while being supported by at least one remaining frame unit.

7. The tracked robotic crawler of claim 1, wherein the at least one arm is rotatable about a point of attachment to the armed frame unit.

8. The tracked robotic crawler of claim 1, wherein the at least one arm is moveable in a two-dimensional plane substantially perpendicular to an axis of rotation of the continuous track of the armed frame unit.

9. The tracked robotic crawler of claim 1, wherein the at least one arm has a plurality of actuated joints.

10. The tracked robotic crawler of claim 1, wherein the at least one arm further comprises a tool affixed thereto at a distal end.

11. The tracked robotic crawler of claim 1, wherein the at least one arm is coupled near a front end of the armed frame unit and the at least one actuated linkage is coupled near a back end of the armed frame unit.

12. The tracked robotic crawler of claim 11, wherein the at least one arm is movable to extend past the front end of the armed frame unit.

13. A method of operating a tracked robotic crawler over a surface comprising the steps of:
(a) providing a first frame and a second frame, each frame having a continuous track with an exposed area for engagement with the surface, wherein at least one continuous track is coupled to a drive source to provide rotation of the continuous track;
(b) providing at least two articulated arms, an arm attached to each of the first frame and the second frame, the arms independently moveable in at least one dimension relative to each other and relative to their corresponding frames and selectively movable to a position out of contact with the surface;
(c) providing an actuated multi-degree of freedom linkage arm coupled between the first frame and the second frame; and
(d) coordinating rotation of the continuous track, movement of the articulated arms, and actuation of the multi-degree of freedom linkage arm to control pose and movement of the tracked robotic crawler over the surface and positioning the articulated arms to extend beyond respective ends of the first frame and the second frame so as to contact the surface thereby providing additional stability and/or traction to the tracked robotic crawler.

14. The method of claim 13 wherein step (d) comprises positioning the first frame and the second frame in a tank-like configuration where the first frame and the second frame are side by side and substantially parallel.

15. The method of claim 14 wherein step (d) comprises positioning the articulated arms to extend in the same direction past ends of the first frame and the second frame.

16. The method of claim 13 wherein step (d) comprises positioning the first frame and the second frame in a train-like configuration where the first frame and the second frame are aligned end to end.

17. The method of claim 16 wherein step (d) comprises positioning the articulated arms to extend past distal ends of the first frame and the second frame.

18. The method of claim 13 wherein step (d) comprises positioning the first frame and the second frame in an outside-climbing configuration where the first frame and the second frame are positioned with exposed portions of the continuous tracks facing toward each other and in contact with opposite outer surfaces of a structure to be climbed.

19. The method of claim 13 wherein step (d) comprises positioning the first frame and the second frame in a inside-climbing configuration where the first frame and the second frame are positioned with exposed portions of the continuous tracks facing away from each other and in contact with opposite inner surfaces of a structure to be climbed.

20. The method of claim 19 wherein step (d) comprises positioning the articulated arm on each frame unit in a position to contact the same inner surface of the structure as the corresponding exposed portion of the continuous track thereby providing additional stability and/or traction to the tracked robotic crawler.

21. The method of claim 19 wherein step (d) comprises positioning the articulated arm on each frame unit in a position to contact the inner surface of the structure opposite the corresponding exposed portion of the continuous track thereby providing additional stability and/or traction to the tracked robotic crawler.

22. The method of claim 14 wherein step (d) comprises:
positioning the articulated arms to extend in a forward direction past the end of one of the first frame and the second frame; and
deflecting the articulated arms inward to form a pointed configured.

23. The method of claim 14 wherein step (d) comprises:
deflecting the articulated arms inward to interface with a convex surface thereby providing additional stability and/or traction to the tracked robotic crawler.

24. The method of claim 14 wherein step (d) comprises:
deflecting the articulated arms outward to interface with a concave surface thereby providing additional stability and/or traction to the tracked robotic crawler.

* * * * *